United States Patent
Yi et al.

(10) Patent No.: US 10,270,891 B2
(45) Date of Patent: Apr. 23, 2019

(54) METHOD FOR HANDLING AN UNKNOWN MAC PDU AND DEVICE THEREFOR

(71) Applicant: LG Electronics Inc., Seoul (KR)

(72) Inventors: Seungjune Yi, Seoul (KR); Sunyoung Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 72 days.

(21) Appl. No.: 15/309,880

(22) PCT Filed: Jun. 5, 2015

(86) PCT No.: PCT/KR2015/005653
§ 371 (c)(1),
(2) Date: Nov. 9, 2016

(87) PCT Pub. No.: WO2016/010258
PCT Pub. Date: Jan. 21, 2016

(65) Prior Publication Data
US 2017/0272553 A1 Sep. 21, 2017

Related U.S. Application Data

(60) Provisional application No. 62/024,984, filed on Jul. 15, 2014.

(51) Int. Cl.
*H04W 4/00* (2018.01)
*H04L 29/06* (2006.01)
(Continued)

(52) U.S. Cl.
CPC ............ *H04L 69/22* (2013.01); *H04L 1/0077* (2013.01); *H04L 1/1887* (2013.01);
(Continued)

(58) Field of Classification Search
CPC ....... H04L 69/22; H04L 69/324; H04W 88/02
See application file for complete search history.

(56) References Cited

U.S. PATENT DOCUMENTS

2009/0046631 A1  2/2009  Meylan et al.
2010/0215013 A1  8/2010  Chun et al.
(Continued)

OTHER PUBLICATIONS

ETSI (TS, 136 321, V9.5.0,Jan. 2012, technical specification, LTE; Evolved Universal Terrestrial Radio Access (E-UTRA); Medium Access Control (MAC) protocol specification (3GPP TS 36.321 Version 9.5.0 Release 9) (Year: 2012).*
(Continued)

*Primary Examiner* — Maharishi V Khirodhar
(74) *Attorney, Agent, or Firm* — Dentons US LLP

(57) ABSTRACT

The present invention relates to a wireless communication system. More specifically, the present invention relates to a method and a device for handling an unknown MAC PDU, the method comprising: receiving a MAC (Medium Access Control) PDU (Protocol Data Unit) including a LCID (Logical Channel Identifier); discarding a header field containing the LCID and a corresponding MAC SDU (Service Data Unit) indicated by the header field in the received MAC PDU if the LCID is not configured to the UE; and processing remaining parts of the MAC PDU after the header field and the corresponding MAC SDU are discarded from the MAC PDU.

14 Claims, 14 Drawing Sheets

(51) Int. Cl.
*H04L 1/00* (2006.01)
*H04L 1/18* (2006.01)
*H04L 29/08* (2006.01)
*H04W 88/02* (2009.01)

(52) U.S. Cl.
CPC .......... *H04L 1/1893* (2013.01); *H04L 69/324* (2013.01); *H04W 88/02* (2013.01)

(56) References Cited

U.S. PATENT DOCUMENTS

| | | | | |
|---|---|---|---|---|
| 2011/0176471 | A1* | 7/2011 | Tseng | H04W 76/40 370/312 |
| 2017/0127471 | A1* | 5/2017 | Yu | H04W 76/06 |
| 2018/0076969 | A1* | 3/2018 | Yi | H04L 12/1859 |

OTHER PUBLICATIONS

3GPP (TSG-RAN WG5#40, R5-083223, Addition of new MAC test case for CCCH mapped to the UL SCH/DL-SCH/invalid LCID (logical Channel ID), Aug. 18-22, 2008). (Year: 2008).*
NEC: "User Plane protocol over X2 for Dual connectivity", 3GPP TSG-RAN WG3 #83bis, R3-140676, Mar. 31-Apr. 4, 2014.
3GPP TS 36.321 V122.1, 3GPP; TSGRAN; E-UTRA; Medium Access Control (MAC) protocol specification (Release 12), Jul. 10, 2014.

* cited by examiner

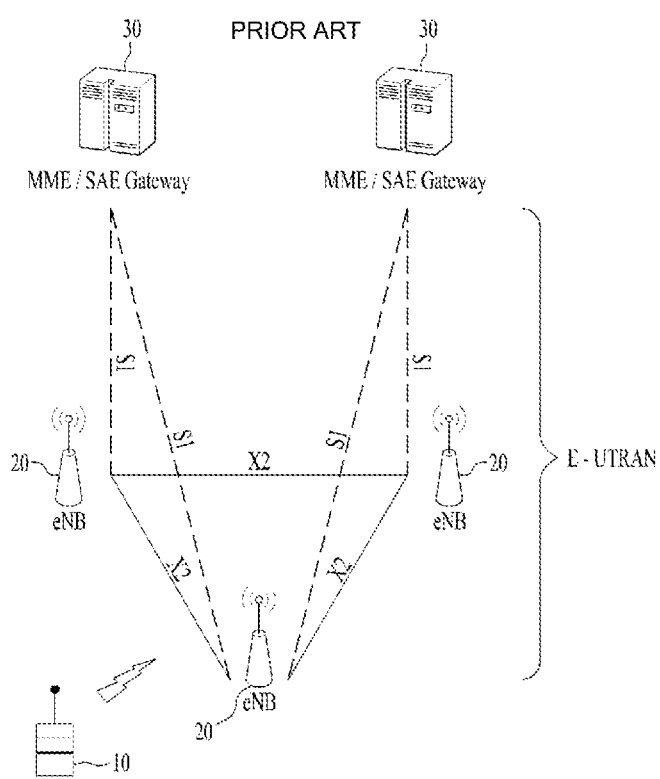

(a) Control-Plane Protocol Stack (b) User-Plane Protocol Stack

R/R/E/LCID/F/L sub-header with
7-bits L field

R/R/E/LCID/F/L sub-header with
15-bits L field

R/R/E/LCID sub-header

Component carrier 5 component carriers → 100 MHz ( a ) C-Plane connectivity of eNBs involved in dual connectivity ( b ) U-Plane connectivity of eNBs involved in dual connectivity

METHOD FOR HANDLING AN UNKNOWN MAC PDU AND DEVICE THEREFOR

This application is a 35 USC § 371 National Stage entry of International Application No. PCT/KR2015/005653 filed on Jun. 5, 2015, and claims priority to U.S. Provisional Application No. 62/024,984 filed on Jul. 15, 2014, all of which are hereby incorporated by reference in their entireties as if fully set forth herein.

TECHNICAL FIELD

The present invention relates to a wireless communication system and, more particularly, to a method for handling an unknown MAC (Medium Access Control Protocol Data Unit) and a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

DISCLOSURE

Technical Problem

An object of the present invention devised to solve the problem lies in a method and device for handling an unknown MAC PDU. The technical problems solved by the present invention are not limited to the above technical problems and those skilled in the art may understand other technical problems from the following description.

Technical Solution

The object of the present invention can be achieved by providing a method for a User Equipment (UE) operating in a wireless communication system, the method comprising: receiving a MAC (Medium Access Control) PDU (Protocol Data Unit) including a LCID (Logical Channel Identifier); discarding a header field containing the LCID and a corresponding MAC SDU (Service Data Unit) indicated by the header field in the received MAC PDU if the LCID is not configured to the UE; and processing remaining parts of the MAC PDU after the header field and the corresponding MAC SDU are discarded from the MAC PDU.

In another aspect of the present invention, provided herein is a UE (User Equipment) for operating in a wireless communication system, the UE comprising: an RF (Radio Frequency) module; and a processor configured to control the RF module, wherein the processor is configured to receive a MAC (Medium Access Control) PDU (Protocol Data Unit) including a LCID (Logical Channel Identifier), to discard a header field containing the LCID and a corresponding MAC SDU (Service Data Unit) indicated by the header field in the received MAC PDU if the LCID is not configured to the UE, and to process remaining parts of the MAC PDU after the header field and the corresponding MAC SDU are discarded from the MAC PDU.

Meanwhile, In another aspect of the present invention, provided herein is a method for a User Equipment (UE) operating in a wireless communication system, the method comprising: receiving a MAC (Medium Access Control) PDU (Protocol Data Unit) including a LCID (Logical Channel Identifier) not configured to the UE; discarding a header field containing the LCID and a corresponding MAC SDU (Ser-vice Data Unit) indicated by the header field in the received MAC PDU and processing remaining parts of the MAC PDU, if the MAC PDU is received from a SeNB (Secondary eMB), and discarding the MAC PDU, if the MAC PDU is received from a MeNB (Master eNB).

In another aspect of the present invention, provided herein is a UE (User Equipment) for operating in a wireless communication system, the UE comprising: an RF (Radio Frequency) module; and a processor configured to control the RF module, wherein the processor is configured to receive a MAC (Medium Access Control) PDU (Protocol Data Unit) including a LCID (Logical Channel Identifier) not configured to the UE, to discard a header field containing the LCID and a corresponding MAC SDU (Service Data Unit) indicated by the header field in the received MAC PDU and processing remaining parts of the MAC PDU, if the MAC PDU is received from a SeNB (Secondary eMB), and to discard the MAC PDU, if the MAC PDU is received from a MeNB (Master eNB).

Preferably, the MAC PDU is received through a dedicated resource.

Preferably, the MAC PDU is received through a dedicated resource if the MAC PDU is received for a UE's C-RNTI or Semi-Persistent Scheduling C-RNTI, or by configured downlink assignment.

Preferably, the LCID is an identifier for a logical channel released by the UE.

Preferably, the method further comprises: storing the LCID of the logical channel during a specific time after the logical channel is released.

Preferably, the specific time is configured by a timer or pre-defined subframes.

Preferably, a value of the LCID is one of identities of logical channels.

Preferably, the value of the LCID is one of 00001-01010.

It is to be understood that both the foregoing general description and the following detailed description of the present invention are exemplary and explanatory and are intended to provide further explanation of the invention as claimed.

Advantageous Effects

According to the present invention, a MAC PDU including a LCID not configured to the UE can be efficiently handling. It will be appreciated by persons skilled in the art that that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 2A is a block diagram illustrating network structure of an evolved universal mobile telecommunication system (E-UMTS)

BEST MODE

Figure 1:
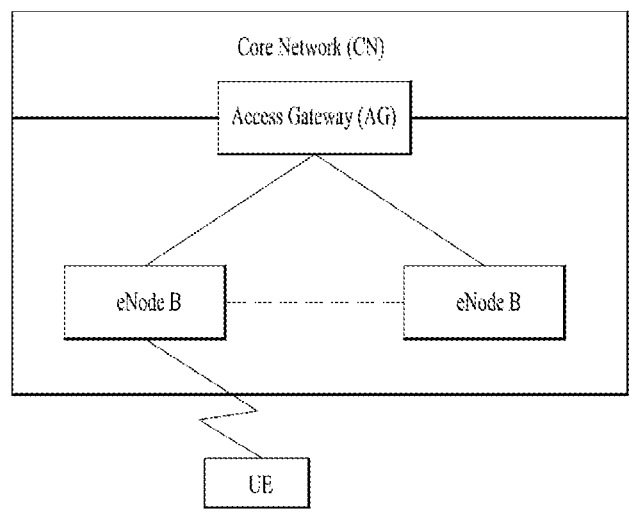
FIG. 1 is a diagram showing a network structure of an Evolved Universal Mobile Telecommunications System (E-UMTS) as an example of a wireless communication system.

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

Figure 2B:
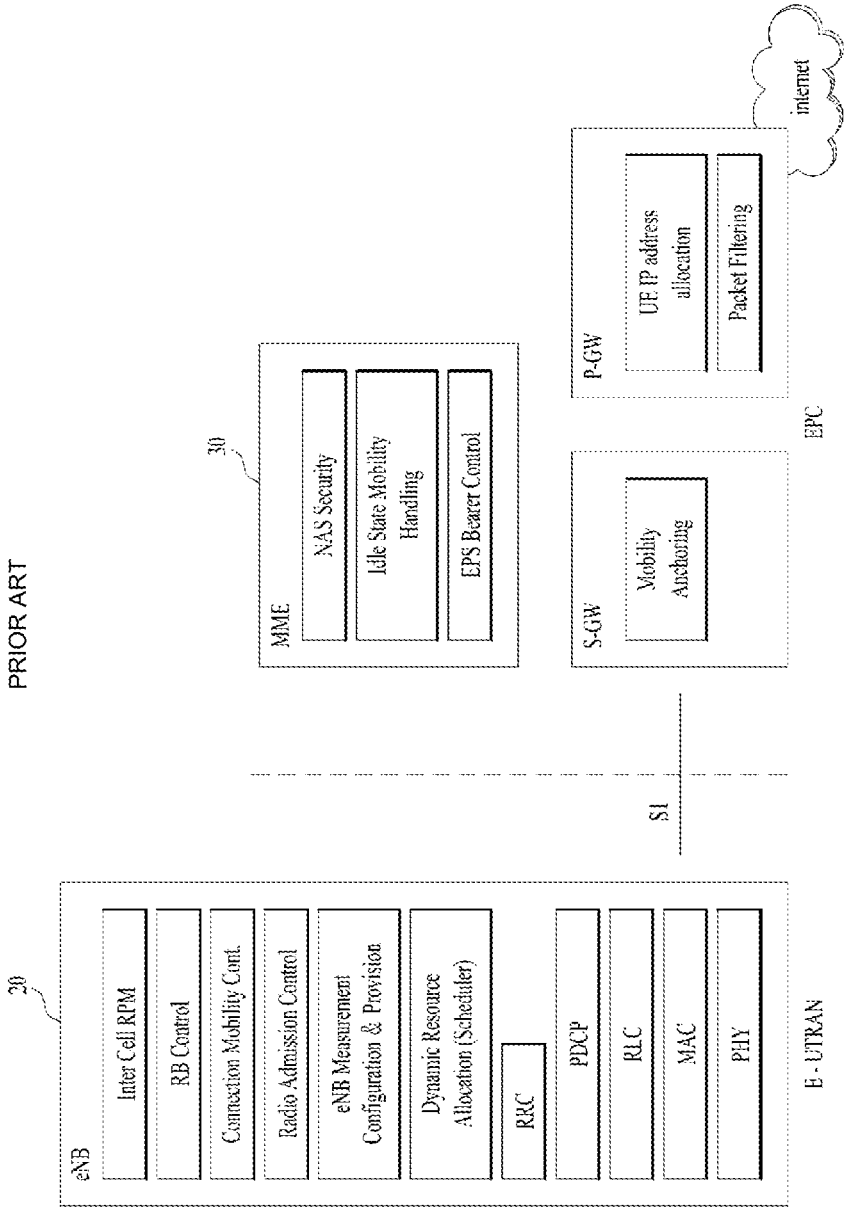
FIG. 2B is a block diagram depicting architecture of a typical E-UTRAN and a typical EPC.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 3:
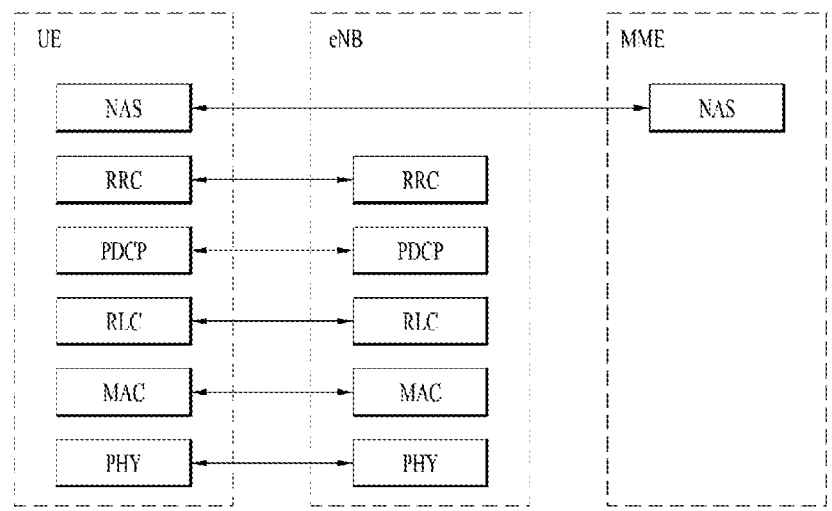
FIG. 3 is a diagram showing a control plane and a user plane of a radio interface protocol between a UE and an E-UTRAN based on a 3rd generation partnership project (3GPP) radio access network standard.
Figure 3:
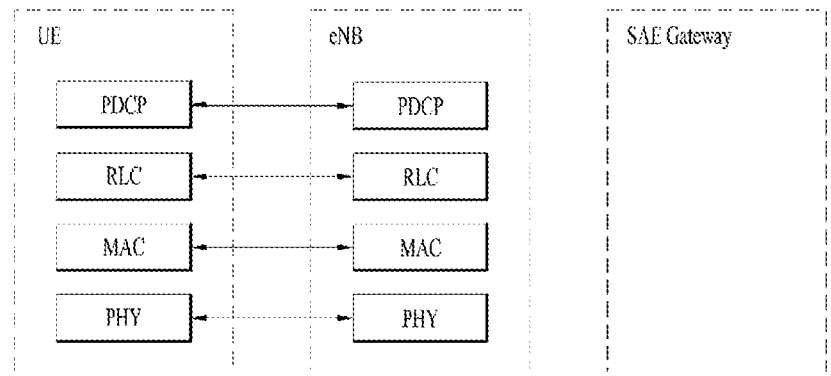

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4:
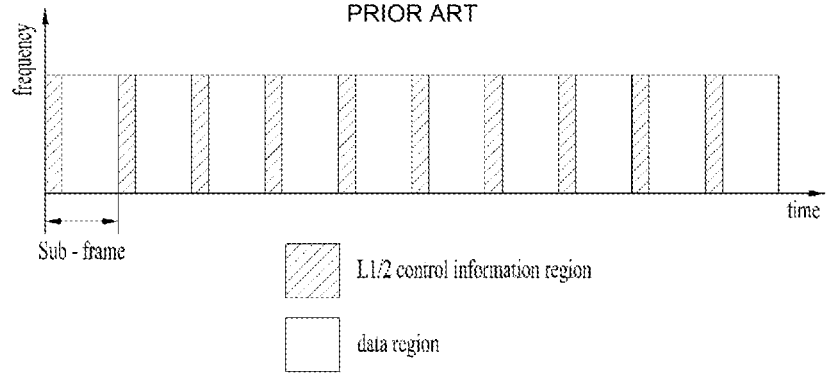
FIG. 4 is a diagram of an example physical channel structure used in an E-UMTS system.

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

Figure 5:
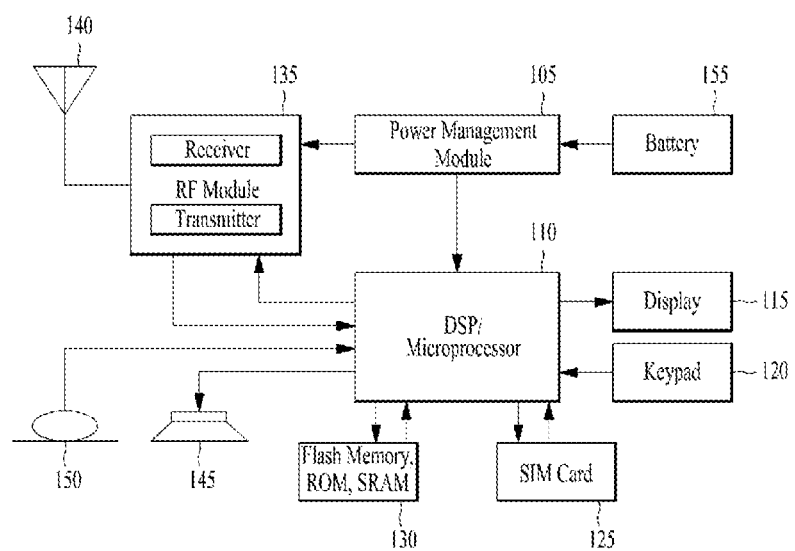
FIG. 5 is a block diagram of a communication apparatus according to an embodiment of the present invention.

FIG. 5 is a block diagram of a communication apparatus according to an embodiment of the present invention.

The apparatus shown in FIG. 5 can be a user equipment (UE) and/or eNB adapted to perform the above mechanism, but it can be any apparatus for performing the same operation.

As shown in FIG. 5, the apparatus may comprises a DSP/microprocessor (110) and RF module (transceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 5 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 5 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

Figure 6:
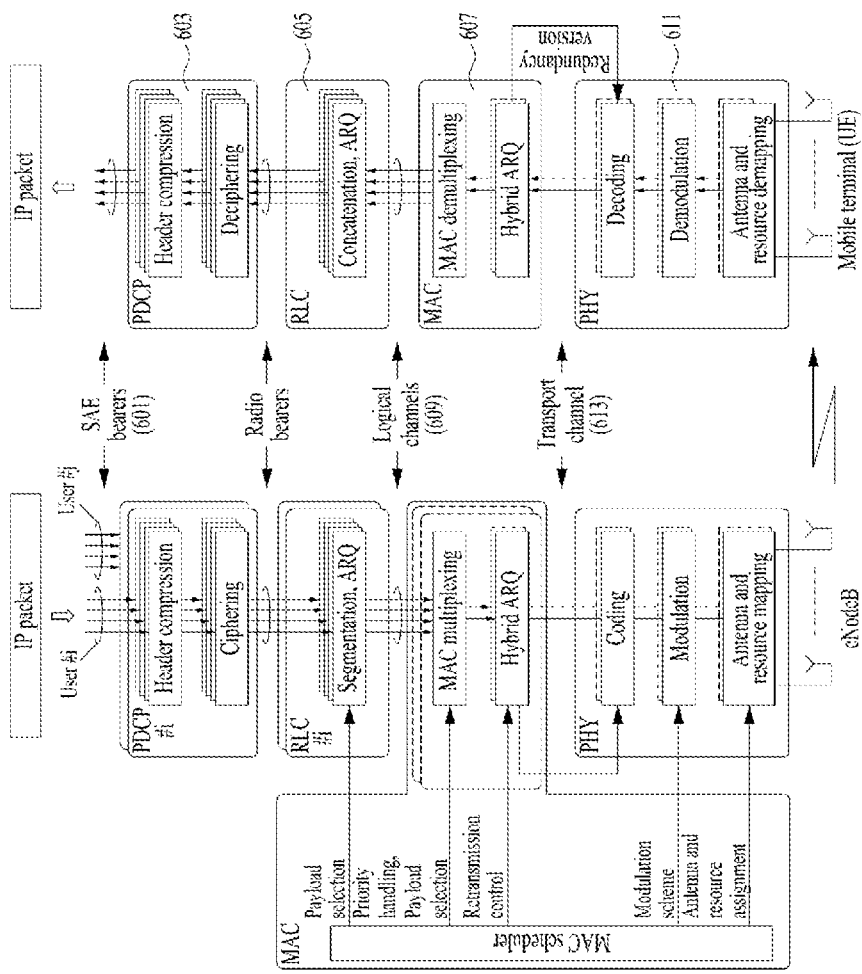
FIG. 6 is a diagram for a general overview of the LTE protocol architecture for the downlink.

FIG. 6 is a diagram for a general overview of the LTE protocol architecture for the downlink.

A general overview of the LTE protocol architecture for the downlink is illustrated in FIG. 6. Furthermore, the LTE protocol structure related to uplink transmissions is similar to the downlink structure in FIG. 9, although there are differences with respect to transport format selection and multi-antenna transmission.

Data to be transmitted in the downlink enters in the form of IP packets on one of the SAE bearers (601). Prior to transmission over the radio interface, incoming IP packets are passed through multiple protocol entities, summarized below and described in more detail in the following sections:

Packet Data Convergence Protocol (PDCP, 603) performs IP header compression to reduce the number of bits necessary to transmit over the radio interface. The header-compression mechanism is based on ROHC, a standardized header-compression algorithm used in WCDMA as well as several other mobile-communication standards. PDCP (903) is also responsible for ciphering and integrity protection of the transmitted data. At the receiver side, the PDCP protocol performs the corresponding deciphering and decompression operations. There is one PDCP entity per radio bearer configured for a mobile terminal.

Radio Link Control (RLC, 605) is responsible for segmentation/concatenation, retransmission handling, and in-sequence delivery to higher layers. Unlike WCDMA, the RLC protocol is located in the eNodeB since there is only a single type of node in the LTE radio-access-network architecture. The RLC (605) offers services to the PDCP (603) in the form of radio bearers. There is one RLC entity per radio bearer configured for a terminal.

Medium Access Control (MAC, 607) handles hybrid-ARQ retransmissions and uplink and downlink scheduling. The scheduling functionality is located in the eNodeB, which has one MAC entity per cell, for both uplink and downlink. The hybrid-ARQ protocol part is present in both the transmitting and receiving end of the MAC protocol. The MAC (607) offers services to the RLC (605) in the form of logical channels (609).

Physical Layer (PHY, 611), handles coding/decoding, modulation/demodulation, multi-antenna mapping, and other typical physical layer functions. The physical layer (611) offers services to the MAC layer (607) in the form of transport channels (661).

The MAC (607) offers services to the RLC (605) in the form of logical channels (609). A logical channel (609) is defined by the type of information it carries and are generally classified into control channels, used for transmission of control and configuration information necessary for operating an LTE system, and traffic channels, used for the user data.

Figure 7A:
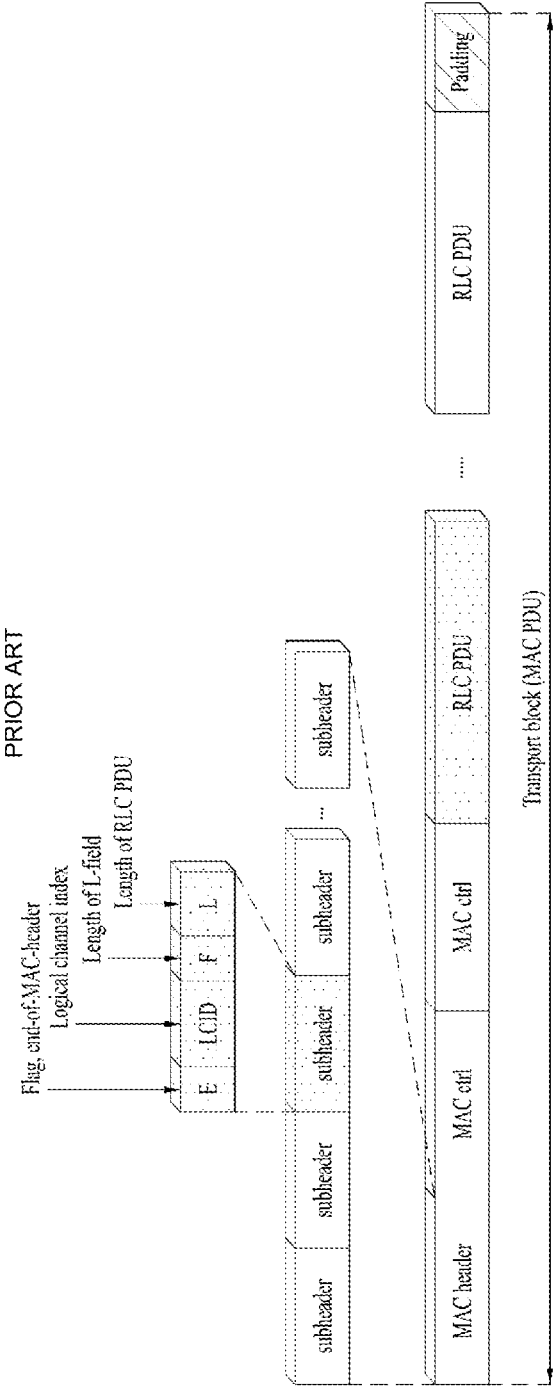
FIG. 7a is a diagram for MAC header and SDU multiplexing and FIG. 7b is a diagram for MAC operation in the case of multiple component carriers.
Figure 7B:
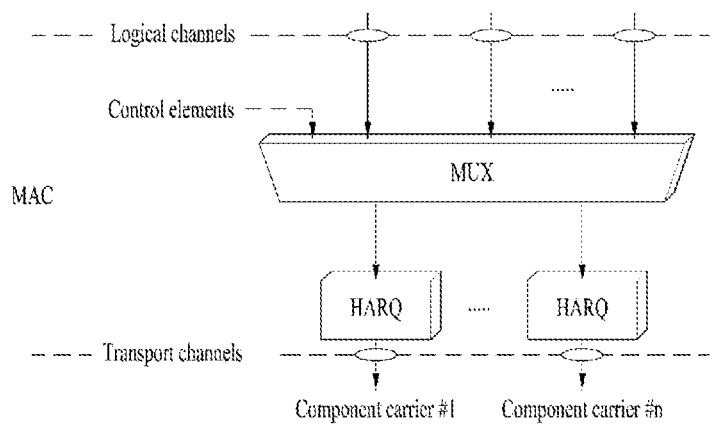

FIG. 7a is a diagram for MAC header and SDU multiplexing and FIG. 7b is a diagram for MAC operation in the case of multiple component carriers.

To support priority handling, multiple logical channels, where each logical channel has its own RLC entity, can be multiplexed into one transport channel by the MAC layer. At the receiver, the MAC layer handles the corresponding demultiplexing and forwards the RLC PDUs to their respective RLC entity for in-sequence delivery and the other functions handled by the RLC. To support the demultiplexing at the receiver, a MAC header, shown in FIG. 7a, is used.

To each RLC PDU, there is an associated sub-header in the MAC header. The sub-header contains the identity of the logical channel (LCID) from which the RLC PDU originated and the length of the PDU in bytes. There is also a flag indicating whether this is the last sub-header or not. One or several RLC PDUs, together with the MAC header and, if necessary, padding to meet the scheduled transport-block size, form one transport block which is forwarded to the physical layer.

In addition to multiplexing of different logical channels, the MAC layer can also insert the so-called MAC control elements into the transport blocks to be transmitted over the transport channels. A MAC control element is used for inband control signaling—for example, timing-advance commands and random access response. Control elements are identified with reserved values in the LCID field, where the LCID value indicates the type of control information.

Furthermore, the length field in the sub-header is removed for control elements with a fixed length.

The MAC multiplexing functionality is also responsible for handling of multiple component carriers in the case of carrier aggregation. The basic principle for carrier aggregation is independent processing of the component carriers in the physical layer, including control signaling, scheduling and hybrid-ARQ retransmissions, while carrier aggregation is invisible to RLC and PDCP. Carrier aggregation is therefore mainly seen in the MAC layer, as illustrated in FIG. 7b, where logical channels, including any MAC control elements, are multiplexed to form one (two in the case of spatial multiplexing) transport block(s) per component carrier with each component carrier having its own hybrid-ARQ entity. Each MAC entity is configured by RRC with a serving cell supporting PUCCH transmission and contention based Random Access.

Meanwhile, when a MAC entity receives a MAC PDU for the UE's C-RNTI or Semi-Persistent Scheduling C-RNTI, or by the configured downlink assignment, containing reserved or invalid values, the MAC entity may discard the received PDU.

When a MAC entity receives a MAC PDU on MCH containing reserved values, the UE may ignore the fields in the PDU header and the control elements containing reserved values and the corresponding parts indicated by the fields in the received PDU.

Figure 8A:
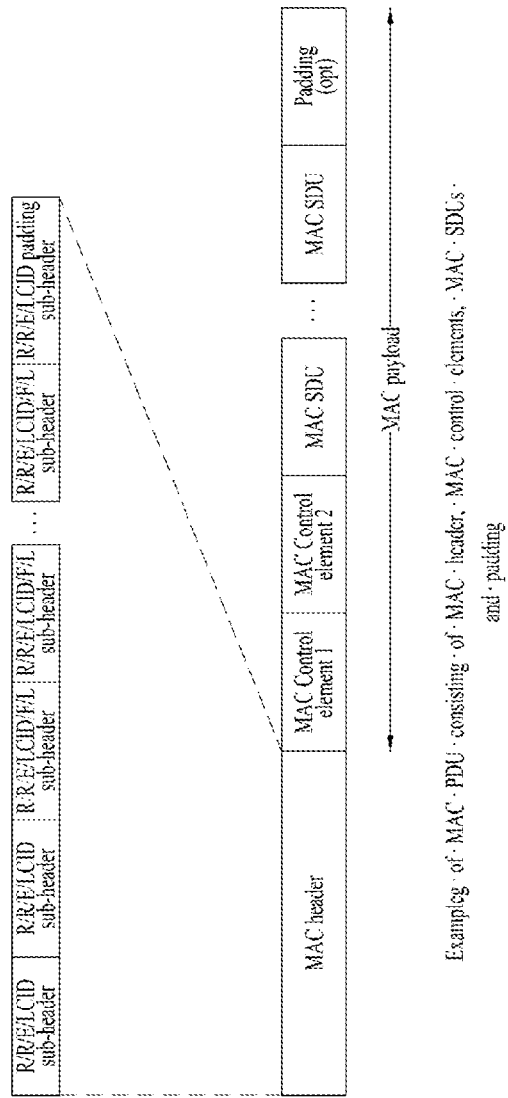
FIGS. 8a to 8c are conceptual diagrams illustrating for a MAC PDU structure.
Figure 8B:
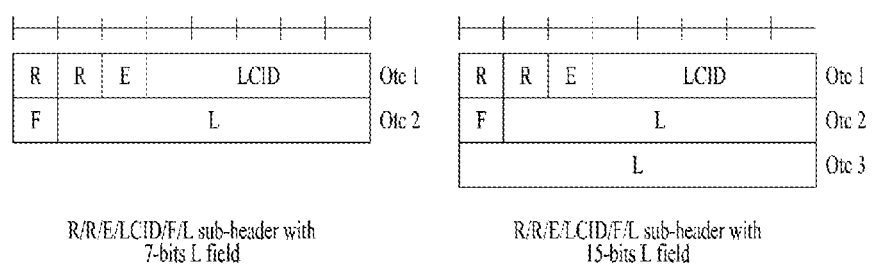
Figure 8C:
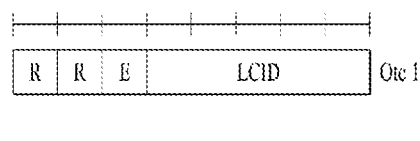

FIGS. 8a to 8c are conceptual diagrams illustrating for a MAC PDU structure.

A MAC PDU consists of a MAC header, zero or more MAC Service Data Units (MAC SDU), zero, or more MAC control elements, and optionally padding; as described in FIG. 8a. Both the MAC header and the MAC SDUs are of variable sizes.

A MAC PDU header consists of one or more MAC PDU subheaders; each subheader corresponds to either a MAC SDU, a MAC control element or padding.

A MAC PDU subheader consists of the six header fields R/R/E/LCID/F/L but for the last subheader in the MAC PDU and for fixed sized MAC control elements. The last subheader in the MAC PDU and subheaders for fixed sized MAC control elements consist solely of the four header fields R/R/E/LCID. A MAC PDU subheader corresponding to padding consists of the four header fields R/R/E/LCID.

MAC PDU subheaders have the same order as the corresponding MAC SDUs, MAC control elements and padding. MAC control elements are always placed before any MAC SDU.

Padding occurs at the end of the MAC PDU, except when single-byte or two-byte padding is required. Padding may have any value and the UE shall ignore it. When padding is performed at the end of the MAC PDU, zero or more padding bytes are allowed.

When single-byte or two-byte padding is required, one or two MAC PDU subheaders corresponding to padding are placed at the beginning of the MAC PDU before any other MAC PDU subheader. A maximum of one MAC PDU can be transmitted per TB per UE. A maximum of one MCH MAC PDU can be transmitted per TTI.

The MAC header is of variable size and consists of the following fields:

1) LCID: The Logical Channel ID field identifies the logical channel instance of the corresponding MAC SDU or the type of the corresponding MAC control element or padding as described in Tables 1, Table 2 and Table 3 for the DL-SCH, UL-SCH and MCH respectively. There is one LCID field for each MAC SDU, MAC control element or padding included in the MAC PDU. In addition to that, one or two additional LCID fields are included in the MAC PDU, when single-byte or two-byte padding is required but cannot be achieved by padding at the end of the MAC PDU. The LCID field size is 5 bits.

TABLE 1

Values of LCID for DL-SCH

| Index | LCID values |
|---|---|
| 00000 | CCCH |
| 00001-01010 | Identity of the logical channel |
| 01011-11010 | Reserved |
| 11011 | Activation/Deactivation |
| 11100 | UE Contention Resolution Identity |
| 11101 | Timing Advance Command |
| 11110 | DRX Command |
| 11111 | Padding |

TABLE 2

Values of LCID for UL-SCH

| Index | LCID values |
|---|---|
| 00000 | CCCH |
| 00001-01010 | Identity of the logical channel |
| 01011-11000 | Reserved |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

TABLE 3

Values of LCID for MCH

| Index | LCID values |
|---|---|
| 00000 | MCCH (see note) |
| 00001-11100 | MTCH |
| 11101 | Reserved |
| 11110 | MCH Scheduling Information |
| 11111 | Padding |

NOTE:
If there is no MCCH on MCH, an MTCH could use this value.

2) L: The Length field indicates the length of the corresponding MAC SDU or variable-sized MAC control element in bytes. There is one L field per MAC PDU subheader except for the last subheader and subheaders corresponding to fixed-sized MAC control elements. The size of the L field is indicated by the F field.

3) F: The Format field indicates the size of the Length field as indicated in Table 4. There is one F field per MAC PDU subheader except for the last subheader and subheaders corresponding to fixed-sized MAC control elements. The size of the F field is 1 bit. If the size of the MAC SDU or variable-sized MAC control element is less than 128 bytes, the value of the F field is set to 0, otherwise it is set to 1.

TABLE 4

Values of F field

| Index | Size of Length field (in bits) |
|---|---|
| 0 | 7 |
| 1 | 15 |

4) E: The Extension field is a flag indicating if more fields are present in the MAC header or not. The E field is set to "1" to indicate another set of at least R/R/E/LCID fields. The E field is set to "0" to indicate that either a MAC SDU, a MAC control element or padding starts at the next byte.

5) R: Reserved bit, set to "0".

In the legacy system, the Logical Channel ID (LCID) is used to identify the logical channel instance of the corresponding MAC SDU or the type of the corresponding MAC control element or padding. There is one LCID field for each MAC SDU, MAC control element or padding included in the MAC PDU. The Logical Channel ID is allocated for each logical channel when the Radio Bearer is setup. Currently, there are 8 values available for data radio bearer (3 to 10).

Figure 9:
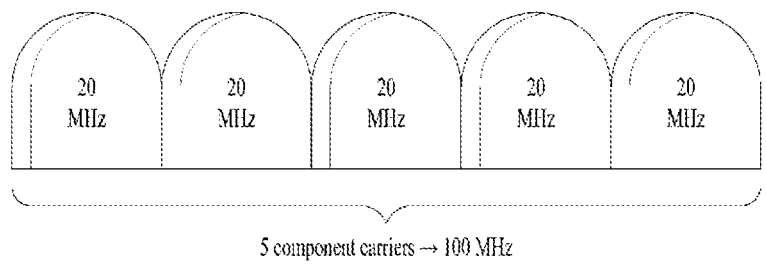
FIG. 9 is a diagram for carrier aggregation.

FIG. 9 is a diagram for carrier aggregation.

Carrier aggregation technology for supporting multiple carriers is described with reference to FIG. 9 as follows. As mentioned in the foregoing description, it may be able to support system bandwidth up to maximum 100 MHz in a manner of bundling maximum 5 carriers (component carriers: CCs) of bandwidth unit (e.g., 20 MHz) defined in a legacy wireless communication system (e.g., LTE system) by carrier aggregation. Component carriers used for carrier aggregation may be equal to or different from each other in bandwidth size. And, each of the component carriers may have a different frequency band (or center frequency). The component carriers may exist on contiguous frequency bands. Yet, component carriers existing on non-contiguous frequency bands may be used for carrier aggregation as well. In the carrier aggregation technology, bandwidth sizes of uplink and downlink may be allocated symmetrically or asymmetrically.

Multiple carriers (component carriers) used for carrier aggregation may be categorized into primary component carrier (PCC) and secondary component carrier (SCC). The PCC may be called P-cell (primary cell) and the SCC may be called S-cell (secondary cell). The primary component carrier is the carrier used by a base station to exchange traffic and control signaling with a user equipment. In this case, the control signaling may include addition of component carrier, setting for primary component carrier, uplink (UL) grant, downlink (DL) assignment and the like. Although a base station may be able to use a plurality of component carriers, a user equipment belonging to the corresponding base station may be set to have one primary component carrier only. If a user equipment operates in a single carrier mode, the primary component carrier is used. Hence, in order to be independently used, the primary component carrier should be set to meet all requirements for the data and control signaling exchange between a base station and a user equipment.

Meanwhile, the secondary component carrier may include an additional component carrier that can be activated or deactivated in accordance with a required size of transceived data. The secondary component carrier may be set to be used only in accordance with a specific command and rule received from a base station. In order to support an additional bandwidth, the secondary component carrier may be set to be used together with the primary component carrier. Through an activated component carrier, such a control signal as a UL grant, a DL assignment and the like can be received by a user equipment from a base station. Through an activated component carrier, such a control signal in UL as a channel quality indicator (CQI), a precoding matrix index (PMI), a rank indicator (RI), a sounding reference signal (SRS) and the like can be transmitted to a base station from a user equipment.

Resource allocation to a user equipment can have a range of a primary component carrier and a plurality of secondary component carriers. In a multi-carrier aggregation mode, based on a system load (i.e., static/dynamic load balancing), a peak data rate or a service quality requirement, a system may be able to allocate secondary component carriers to DL and/or UL asymmetrically. In using the carrier aggregation technology, the setting of the component carriers may be provided to a user equipment by a base station after RRC connection procedure. In this case, the RRC connection may mean that a radio resource is allocated to a user equipment based on RRC signaling exchanged between an RRC layer of the user equipment and a network via SRB. After completion of the RRC connection procedure between the user equipment and the base station, the user equipment may be provided by the base station with the setting information on the primary component carrier and the secondary component carrier. The setting information on the secondary component carrier may include addition/deletion (or activation/deactivation) of the secondary component carrier. Therefore, in order to activate a secondary component carrier between a base station and a user equipment or deactivate a previous secondary component carrier, it may be necessary to perform an exchange of RRC signaling and MAC control element.

The activation or deactivation of the secondary component carrier may be determined by a base station based on a quality of service (QoS), a load condition of carrier and other factors. And, the base station may be able to instruct a user equipment of secondary component carrier setting using a control message including such information as an indication type (activation/deactivation) for DL/UL, a secondary component carrier list and the like.

Figure 10:
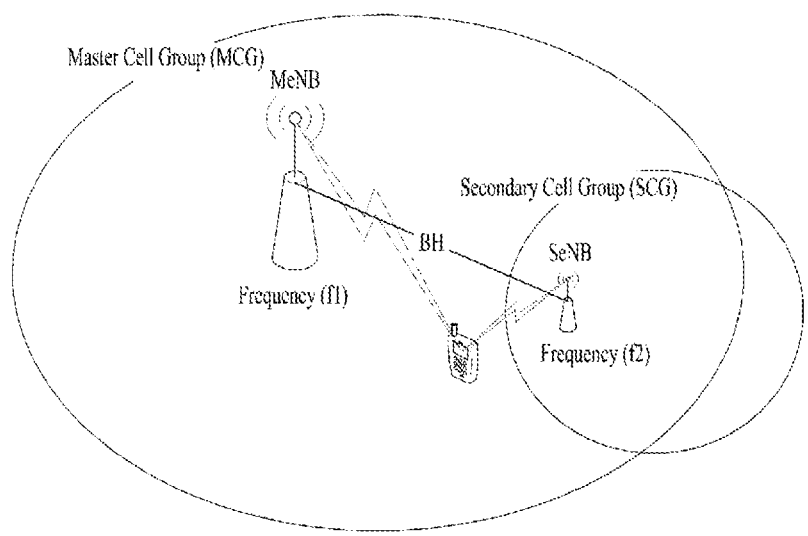
FIG. 10 is a conceptual diagram for dual connectivity (DC) between a Master Cell Group (MCS) and a Secondary Cell Group (SCG)

FIG. 10 is a conceptual diagram for dual connectivity (DC) between a Master Cell Group (MCS) and a Secondary Cell Group (SCG).

The dual connectivity means that the UE can be connected to both a Master eNode-B (MeNB) and a Secondary eNode-B (SeNB) at the same time. The MCG is a group of serving cells associated with the MeNB, comprising of a PCell and optionally one or more SCells. And the SCG is a group of serving cells associated with the SeNB, comprising of the special SCell and optionally one or more SCells. The MeNB is an eNB which terminates at least S1-MME (S1 for the control plane) and the SeNB is an eNB that is providing additional radio resources for the UE but is not the MeNB.

The dual connectivity is a kind of carrier aggregation in that the UE is configured a plurality serving cells. However, unlike all serving cells supporting carrier aggregation of FIG. 10 are served by a same eNB, all serving cells supporting dual connectivity of FIG. 10 are served by different eNBs, respectively at same time. The different eNBs are connected via non-ideal backhaul interface because the UE is connected with the different eNBs at same time.

With dual connectivity, some of the data radio bearers (DRBs) can be offloaded to the SCG to provide high throughput while keeping scheduling radio bearers (SRBs) or other DRBs in the MCG to reduce the handover possibility. The MCG is operated by the MeNB via the frequency of f1, and the SCG is operated by the SeNB via the frequency of f2. The frequency f1 and f2 may be equal. The backhaul interface (BH) between the MeNB and the SeNB is non-ideal (e.g. X2 interface), which means that there is considerable delay in the backhaul and therefore the centralized scheduling in one node is not possible.

Figure 11A:
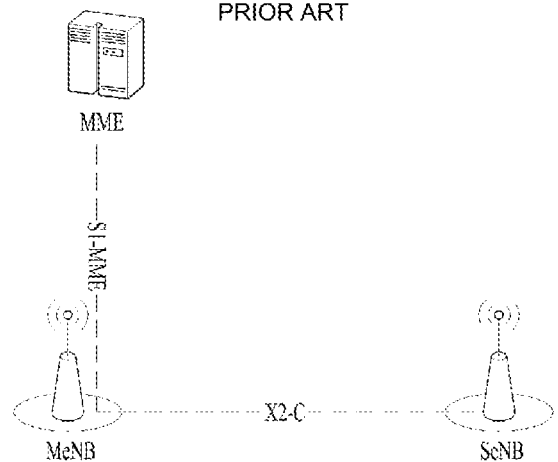
FIG. 11a is a conceptual diagram for C-Plane connectivity of base stations involved in dual connectivity.
Figure 11B:
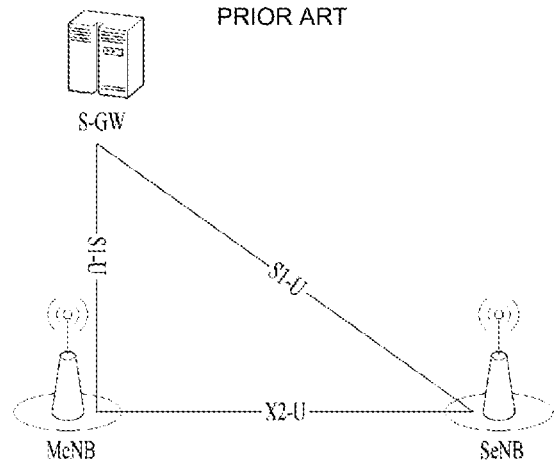
FIG. 11b is a conceptual diagram for U-Plane connectivity of base stations involved in dual connectivity.

FIG. 11a is a conceptual diagram for C-Plane connectivity of base stations involved in dual connectivity, and FIG. 11b is a conceptual diagram for U-Plane connectivity of base stations involved in dual connectivity.

FIG. 11a shows C-plane (Control Plane) connectivity of eNBs involved in dual connectivity for a certain UE: The MeNB is C-plane connected to the MME via S1-MME, the MeNB and the SeNB are interconnected via X2-C(X2-Control plane). As FIG. 8a, Inter-eNB control plane signaling for dual connectivity is performed by means of X2 interface signaling. Control plane signaling towards the MME is performed by means of S1 interface signaling. There is only one S1-MME connection per UE between the MeNB and the MME. Each eNB should be able to handle UEs independently, i.e. provide the PCell to some UEs while providing SCell(s) for SCG to others. Each eNB involved in dual connectivity for a certain UE owns its radio resources and is primarily responsible for allocating radio resources of its cells, respective coordination between MeNB and SeNB is performed by means of X2 interface signaling.

FIG. 11b shows U-plane connectivity of eNBs involved in dual connectivity for a certain UE. U-plane connectivity depends on the bearer option configured: i) For MCG bearers, the MeNB is U-plane connected to the S-GW via S1-U, the SeNB is not involved in the transport of user plane data, ii) For split bearers, the MeNB is U-plane connected to the S-GW via S1-U and in addition, the MeNB and the SeNB are interconnected via X2-U, and iii) For SCG bearers, the SeNB is directly connected with the S-GW via S1-U. If only MCG and split bearers are configured, there is no S1-U termination in the SeNB. In the dual connectivity, enhancement of the small cell is required in order to data offloading from the group of macro cells to the group of small cells. Since the small cells can be deployed apart from the macro cells, multiple schedulers can be separately located in different nodes and operate independently from the UE point of view. This means that different scheduling node would encounter different radio resource environment, and hence, each scheduling node may have different scheduling results.

Figure 12:
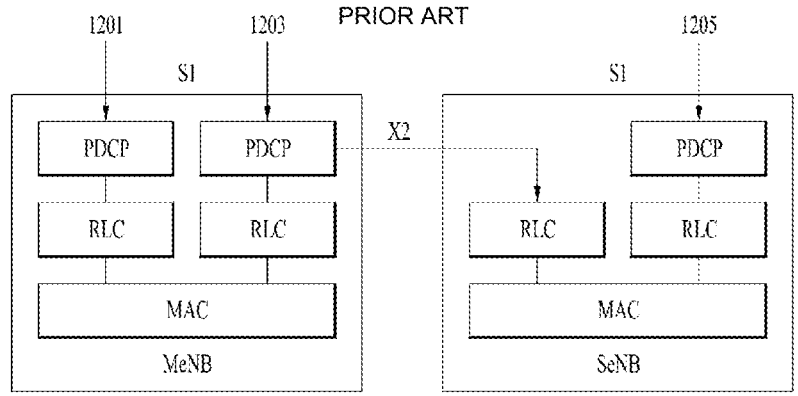
FIG. 12 is a conceptual diagram for radio protocol architecture for dual connectivity.

FIG. 12 is a conceptual diagram for radio protocol architecture for dual connectivity.

E-UTRAN of the present example can support dual connectivity operation whereby a multiple receptions/transmissions (RX/TX) UE in RRC_CONNECTED is configured to utilize radio resources provided by two distinct schedulers, located in two eNBs (or base stations) connected via a non-ideal backhaul over the X2 interface. The eNBs involved in dual connectivity for a certain UE may assume two different roles: an eNB may either act as the MeNB or as the SeNB. In dual connectivity, a UE can be connected to one MeNB and one SeNB.

In the dual connectivity operation, the radio protocol architecture that a particular bearer uses depends on how the bearer is setup. Three alternatives exist, MCG bearer (1201), split bearer (1203) and SCG bearer (1205). Those three alternatives are depicted on FIG. 12. The SRBs (Signaling Radio Bearers) are always of the MCG bearer and therefore only use the radio resources provided by the MeNB. The MCG bearer (1201) is a radio protocol only located in the MeNB to use MeNB resources only in the dual connectivity. And the SCG bearer (1205) is a radio protocol only located in the SeNB to use SeNB resources in the dual connectivity.

Specially, the split bearer (1203) is a radio protocol located in both the MeNB and the SeNB to use both MeNB and SeNB resources in the dual connectivity and the split bearer (1203) may be a radio bearer comprising one Packet Data Convergence Protocol (PDCP) entity, two Radio Link Control (RLC) entities and two Medium Access Control (MAC) entities for one direction. Specially, the dual connectivity operation can also be described as having at least one bearer configured to use radio resources provided by the SeNB.

The expected benefits of the split bearer (1203) are: i) the SeNB mobility hidden to CN, ii) no security impacts with ciphering being required in MeNB only, iii) no data forwarding between SeNBs required at SeNB change, iv) offloads RLC processing of SeNB traffic from MeNB to SeNB, v) little or no impacts to RLC, vi) utilization of radio resources across MeNB and SeNB for the same bearer possible, vii) relaxed requirements for SeNB mobility (MeNB can be used in the meantime).

The expected drawbacks of the split bearer (1203) are: i) need to route, process and buffer all dual connectivity traffic in the MeNB, ii) a PDCP entity to become responsible for routing PDCP PDUs towards eNBs for transmission and reordering them for reception, iii) flow control required between the MeNB and the SeNB, iv) in the uplink, logical channel prioritization impacts for handling RLC retransmissions and RLC Status PDUs (restricted to the eNB where the corresponding RLC entity resides) and v) no support of local break-out and content caching at SeNB for dual connectivity UEs.

In Dual Connectivity, two MAC entities are configured in the UE: one for the MCG and one for the SCG. Each MAC entity is configured by RRC with a serving cell supporting PUCCH transmission and contention based Random Access. The term SpCell refers to such cell, whereas the term SCell refers to other serving cells. The term SpCell either refers to the PCell of the MCG or the PSCell of the SCG depending on if the MAC entity is associated to the MCG or the SCG, respectively. A Timing Advance Group containing the SpCell of a MAC entity is referred to as pTAG, whereas the term sTAG refers to other TAGs.

Figure 13A:
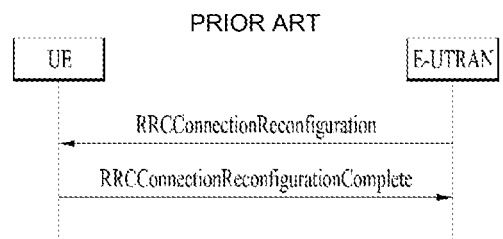
FIG. 13a is a diagram for successful RRC connection reconfiguration.
Figure 13B:
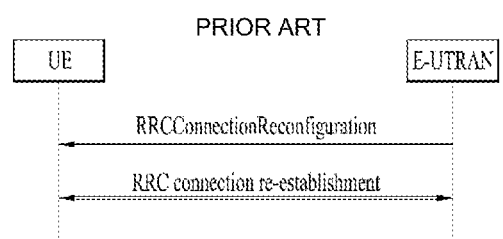
FIG. 13b is a diagram for failure of RRC connection reconfiguration.

The functions of the different MAC entities in the UE operate independently if not otherwise indicated. The timers and parameters used in each MAC entity are configured independently if not otherwise indicated. The Serving Cells, C-RNTI, radio bearers, logical channels, upper and lower layer entities, LCGs, and HARQ entities considered by each MAC entity refer to those mapped to that MAC entity if not otherwise indicated FIG. 13a is a diagram for successful RRC connection reconfiguration, and FIG. 13b is a diagram for failure of RRC connection reconfiguration.

The purpose of RRC connection reconfiguration procedure is to modify an RRC connection, e.g. to establish/modify/release RBs, to perform handover, to setup/modify/release measurements, to add/modify/release SCells. As part of the procedure, NAS dedicated information may be transferred from E-UTRAN to the UE.

When E-UTRAN transmits RRC connection reconfiguration message to modify an RRC connection, if the UE performs reconfiguration successfully, the UE can transmits RRC ConnectionReconfigurationComplete message. However, if the UE doesn't perform reconfiguration successfully, RRC connection re-establishment is performed between E-UTRAN and the UE.

E-UTRAN may initiate the RRC connection reconfiguration procedure to a UE in RRC_CONNECTED. E-UTRAN applies the procedure as follows: i) the mobilityControlInfo is included only when AS-security has been activated, and SRB2 with at least one DRB are setup and not suspended; ii) the establishment of RBs (other than SRB1, that is established during RRC connection establishment) is included only when AS security has been activated; and iii) the addition of SCells is performed only when AS security has been activated.

For each drb-Identity value included in the drb-ToReleaseList that is part of the current UE configuration (DRB release); or for each drb-identity value that is to be released as the result of full configuration option, the UE may release the PDCP entity; release the RLC entity or entities; and release the DTCH logical channel.

If the procedure was triggered due to handover, the UE may indicate the release of the DRB(s) and the eps-BearerIdentity of the released DRB(s) to upper layers after successful handover. Else, the UE may indicate the release of the DRB(s) and the epsBearerIdentity of the released DRB(s) to upper layers immediately.

Figure 14:
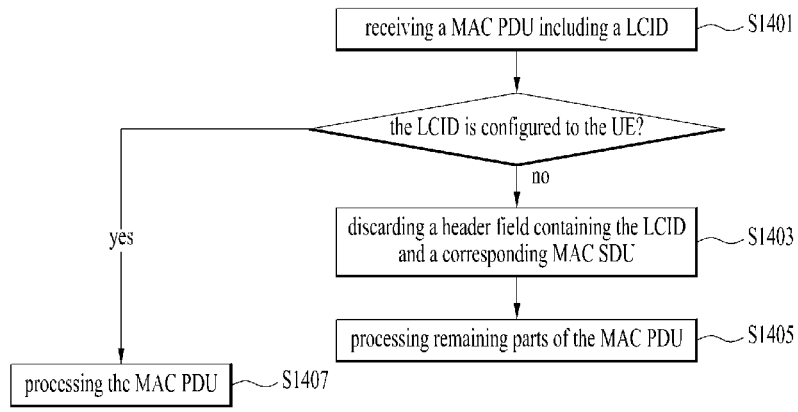
FIG. 14 is a conceptual diagram for handling a MAC PDU according to embodiments of the present invention.

FIG. 14 is a conceptual diagram for handling a MAC PDU according to embodiments of the present invention.

It is invented that when a UE receives a MAC PDU through a dedicated resource and if the MAC PDU includes an MAC SDU targeting to an already released logical channel, the UE ignores or discards the MAC SDU and the corresponding MAC PDU header, and the UE processes the remaining parts of the MAC PDU.

When the UE receives a MAC PDU containing an unknown/nonexisting/released LCID (S1401), the UE ignores/discards the header fields containing the LCID and the corresponding MAC SDU indicated by the header fields in the received PDU instead of discarding the whole MAC PDU (S1403). After ignoring/discarding the header fields containing an unknown/non-existing/released LCID and corresponding MAC SDU, the UE processes the remaining parts of the received MAC PDU as if the MAC PDU does not contain an invalid/reserved value (S1405).

The UE considers that a MAC PDU is received through the dedicated resource if the MAC PDU is received for a UE's C-RNTI or Semi-Persistent Scheduling C-RNTI, or by configured downlink assignment.

When a radio bearer is released, the UE may store the LCID of the logical channel of the released radio bearer in the MAC entity. The UE stores the LCID of the released logical channel only for a short while after the radio bearer is released. Temporal storage of LCID can be realized by a timer or predefined subframes after the radio bearer is released.

Preferably, a value of the LCID is one of identities of logical channels and, the LCID value may be one of 00001-01010, i.e. identity of the logical channel.

If the LCID is configured to the UE, the MAC PDU can be processed normally.

Accordingly, it can be modified at handling of unknown, unforeseen and erroneous protocol data. When a MAC entity receives a MAC PDU for the UE's C-RNTI or Semi-Persistent Scheduling C-RNTI, or by the configured downlink assignment, containing reserved or invalid values, the MAC entity can discard the received PDU.

Meanwhile, when a MAC entity receives a MAC PDU for the UE's C-RNTI or Semi-Persistent Scheduling C-RNTI, or by the configured downlink assignment, containing unknown LCID values among 00001-01010, the UE may ignore the MAC subheader fields containing the LCID values and the corresponding parts indicated by the fields in the received PDU.

When a MAC entity receives a MAC PDU on MCH containing reserved values, the UE may ignore the fields in the PDU header and the control elements containing reserved values and the corresponding parts indicated by the fields in the received PDU.

Figure 15:
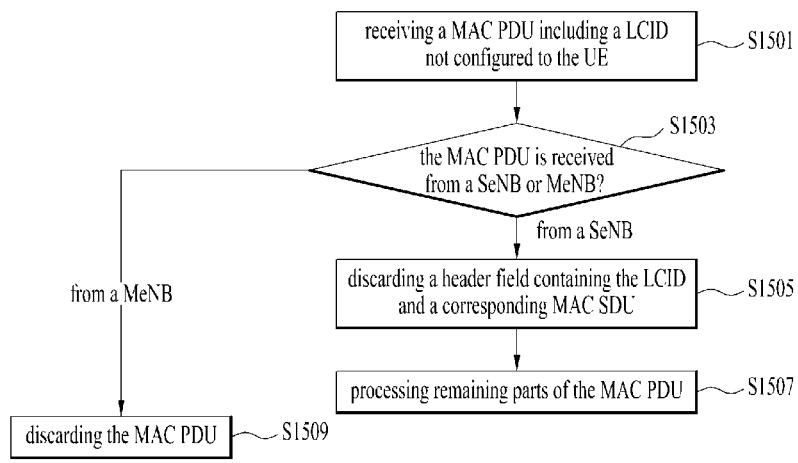
FIG. 15 is a conceptual diagram for handling a MAC PDU for Dual Connectivity according to embodiments of the present invention.

FIG. 15 is a conceptual diagram for handling a MAC PDU for Dual Connectivity according to embodiments of the present invention.

Meanwhile, in Dual Connectivity mentioned above, when a split bearer is reconfigured to a MCG bearer, the SCG RLC entity is released and all the RLC SDUs stored in the SCG RLC buffer are delivered to the PDCP entity. After that, if a MAC PDU is received containing the MAC SDUs targeting to the released SCG RLC entity, which can be identified by the LCID in the MAC PDU header, the UE discards the received MAC PDU because it contains the invalid value in the MAC PDU header, i.e. non-existing Logical Channel ID.

In the prior art, this problem didn't happen, because there is only one eNB and it can stop the HARQ transmission when it decides to release the RB. In dual connectivity, however, there are two eNBs connected through non-ideal backhaul, and it is possible that the SeNB keeps performing HARQ transmission while the MeNB decides to release the RB.

Since a MAC PDU can contain MAC SDUs for multiple logical channels, it is overkill to discard whole MAC SDUs if only one LCID contains invalid value, i.e. already released LCID.

It is invented that when the UE receives a MAC PDU containing an unknown/non-existing/released LCID through a dedicated resource (S1501), if the MAC PDU is received from the SeNB (S1503), the UE ignores/discards the header fields containing the LCID and the corresponding MAC SDU indicated by the header fields in the received PDU (S1505), and the UE processes the remaining part of the MAC PDU (S1507).

Else, if the MAC PDU is received from the MeNB, the UE discards the MAC PDU (S1509).

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the above-described method has been described centering on an example applied to the 3GPP LTE system, the present invention is applicable to a variety of wireless communication systems in addition to the 3GPP LTE system.

The invention claimed is:

1. A method for a User Equipment (UE) operating in a wireless communication system, the method comprising:
receiving a Medium Access Control (MAC) Protocol Data Unit (PDU) including a Logical Channel Identifier (LCID);
discarding a subheader field including the LCID and a MAC Service Data Unit (SDU) related to the LCID in the received MAC PDU when the LCID is an identifier for a logical channel released by the UE; and
processing remaining parts of the MAC PDU, other than the subheader field and the MAC SDU discarded from the MAC PDU,
wherein the LCID is stored during a specific time duration after the logical channel is released, and
wherein the specific time duration is configured based on a timer or pre-defined subframes.

2. The method according to claim 1, wherein the MAC PDU is received through a dedicated resource.

3. The method according to claim 2, wherein the MAC PDU is received through a dedicated resource, when the MAC PDU is received for a UE's Cell-Radio Network Temporary Identifier (C-RNTI), Semi-Persistent Scheduling C-RNTI, or by a configured downlink assignment.

4. The method according to claim 1, wherein a value of the LCID is one of a plurality of values, each corresponding to one of a plurality of logical channels.

5. The method according to claim 4, wherein the value of the LCID is one of 00001-01010.

6. The method according to claim 1, wherein the logical channel is released by a Master node, when the UE is connected with the Master node and a Secondary node simultaneously, and the MAC PDU including the LCID identifying the released logical channel is received from the Secondary node.

7. The method according to claim 6, wherein when the MAC PDU is received from the Master node, the UE discards the MAC PDU.

8. A User Equipment (UE) operating in a wireless communication system, the UE comprising:
a transceiver; and
a processor, operatively coupled to the transceiver,
wherein the processor is configured to:
control the transceiver to receive a Medium Access Control (MAC) Protocol Data Unit (PDU) including a Logical Channel Identifier (LCID),
discard a subheader field including the LCID and a MAC Service Data Unit (SDU) related to the LCID in the received MAC PDU when the LCID is an identifier for a logical channel released by the UE, and
process remaining parts of the MAC PDU, other than the subheader field and the MAC SDU discarded from the MAC PDU,
wherein the LCID is stored during a specific time duration after the corresponding logical channel is released, and
wherein the specific time duration is configured based on a timer or pre-defined subframes.

9. The UE according to claim 8, wherein the MAC PDU is received through a dedicated resource.

10. The UE according to claim 9, wherein the MAC PDU is received through a dedicated resource, when the MAC PDU is received for a UE's Cell-Radio Network Temporary Identifier, Semi-Persistent Scheduling C-RNTI, or by a configured downlink assignment.

11. The UE according to claim 8, wherein a value of the LCID is one of a plurality of values, each corresponding to one of a plurality of logical channels.

12. The UE according to claim 11, wherein the value of the LCID is one of 00001-01010.

13. The UE according to claim 8, wherein the logical channel is released by a Master node, when the UE is connected with the Master node and a Secondary node simultaneously, and the MAC PDU including the LCID identifying the released logical channel is received from the Secondary node.

14. The UE according to claim 13, wherein when the MAC PDU is received from the Master node, the UE discards the MAC PDU.

* * * * *